United States Patent
Chen

(10) Patent No.: US 6,719,027 B1
(45) Date of Patent: Apr. 13, 2004

(54) SOLID TIRE HAVING SHOCK-ABSORBING BLIND BORES

(76) Inventor: Chih-Hsing Chen, No. 250, Sec. 1, Shang-Chang Rd., Hsin-Pu Chen, Hsin-Chu Hsien (TW)

( * ) Notice: Subject to any disclaimer, the term of this patent is extended or adjusted under 35 U.S.C. 154(b) by 0 days.

(21) Appl. No.: 10/315,831

(22) Filed: Dec. 10, 2002

(51) Int. Cl.[7] .................................. B60C 7/10
(52) U.S. Cl. ........................... 152/326; 152/5
(58) Field of Search ................ 152/5, 7, 323, 152/324, 326, 327, 328

(56) References Cited

U.S. PATENT DOCUMENTS 1,026,468 A * 5/1912 Selzer .................... 152/324
1,268,298 A * 6/1918 Swartz .................... 152/325
1,616,843 A * 2/1927 Brubaker ................. 152/324

* cited by examiner

Primary Examiner—Russell D. Stormer
(74) Attorney, Agent, or Firm—Ladas & Parry

(57) ABSTRACT

A solid tire includes an annular tire body having opposite left and right side faces and a ground contacting face interconnecting the left and right side faces. Each of the left and right side faces is formed with a plurality of axially extending blind bores. Each of the blind bores has an open end, a closed end opposite to the open end, a reduced section extending inwardly from the open end, and an enlarged section extending from the reduced section to the closed end. The enlarged section of each of the blind bores reduces gradually in cross-section toward the reduced section and the closed end.

8 Claims, 4 Drawing Sheets

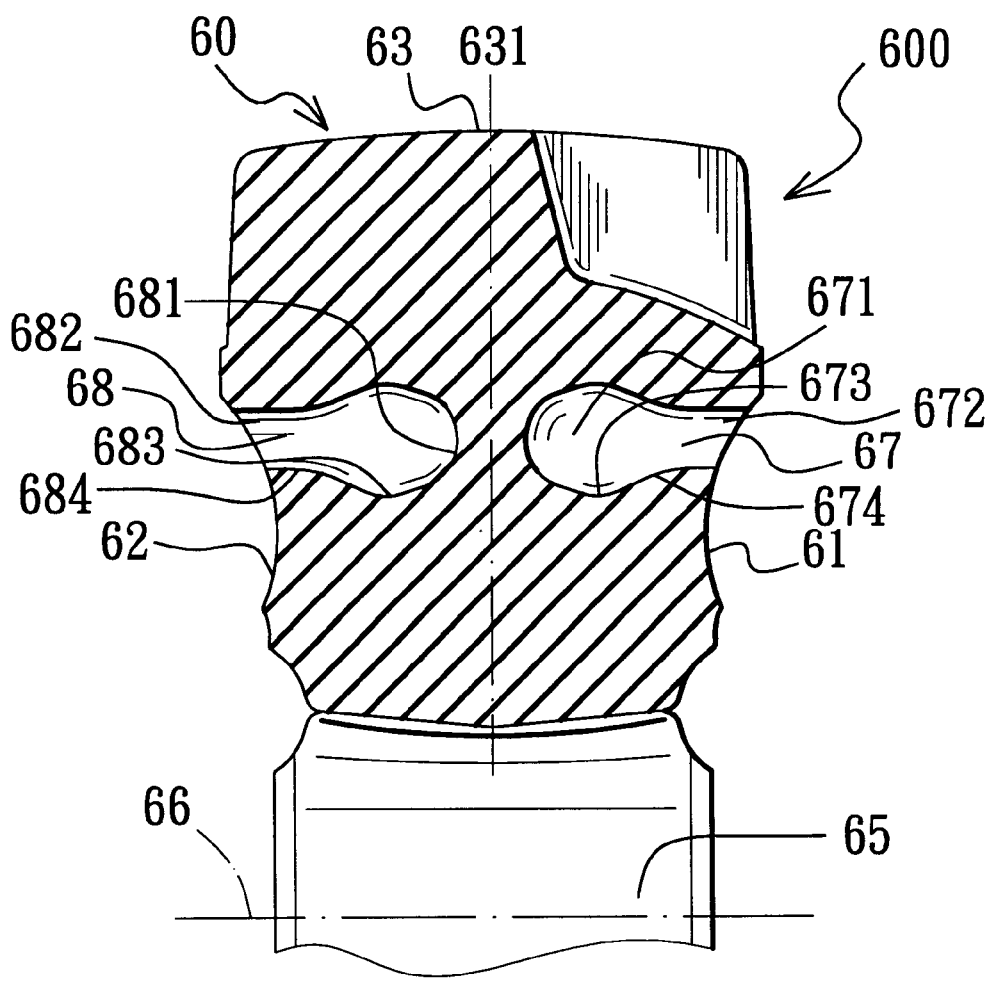
F I G. 4

SOLID TIRE HAVING SHOCK-ABSORBING BLIND BORES

FIELD OF THE INVENTION

The invention relates to a tire, more particularly to a solid tire that has a plurality of axially extending shock-absorbing blind bores.

BACKGROUND OF THE INVENTION

Referring to FIG. 1, a conventional solid tire 100 is used in a vehicle for lifting heavy objects and is shown to include an annular rubber tire body 10 which defines a rotating axis 13 and which has a mounting hole 16, opposite left and right side faces 11, 12, and a circumferential ground contacting face 14 interconnecting the left and right side faces 11, 12.

As illustrated, each of the left and right side faces 11, 12 of the tire body 10 is formed with a plurality of annularly arranged and axially extending shock-absorbing blind bores 18. Each of the blind bores 18 is confined by a bore-defining wall 18W that includes an inner flat wall portion 183 and a cylindrical wall portion 181 that extends from the inner flat wall portion 183 and that terminates at an opening 185 in the respective one of the left and right side faces 11, 12, as best shown in FIG. 2.

When the tire body 10 of the conventional solid tire 100 is subjected to an impact force when moving over a relatively large groove in the road surface, the blind bores 18 in the left and right side faces 11, 12 of the tire body 10 will deform in shape to provide a shock-absorbing effect. However, as shown in FIG. 3, since a sharp corner is formed between the inner flat wall portion 183 and the cylindrical wall portion 181 of each of the blind bores 18 and since the blind bores 18 are substantially uniform in cross-section from the flat wall portion 183 to the opening 185, non-uniform deformation of the blind bores 18 will occur during use, which tends to result in cracking of the tire body 10 at the aforesaid corners, thereby shortening the service life of the conventional solid tire 100.

SUMMARY OF THE INVENTION

The object of this invention is to provide a solid tire that has two side faces formed with a plurality of shock-absorbing blind bores so as to be capable of eliminating the disadvantage of the aforesaid conventional solid tire.

Accordingly, a solid tire of the present invention includes: an annular tire body having opposite left and right side faces and a ground contacting face interconnecting the left and right side faces. Each of the left and right side faces is formed with a plurality of axially extending blind bores. Each of the blind bores has an open end, a closed end opposite to the open end, a reduced section extending inwardly from the open end, and an enlarged section extending from the reduced section to the closed end. The enlarged section reduces gradually in cross-section toward the reduced section and the closed end.

BRIEF DESCRIPTION OF THE DRAWINGS

Other features and advantages of this invention will become more apparent in the following detailed description of the preferred embodiments of this invention, with reference to the accompanying drawings, in which:

FIG. 4 is a fragmentary sectional view of the first preferred embodiment of a solid tire according to the present invention;

FIG. 7 is a side view of an embodiment of a solid tire having axially offset blind bores on each side face.

DETAILED DESCRIPTION OF THE PREFERRED EMBODIMENTS

Figure 1:
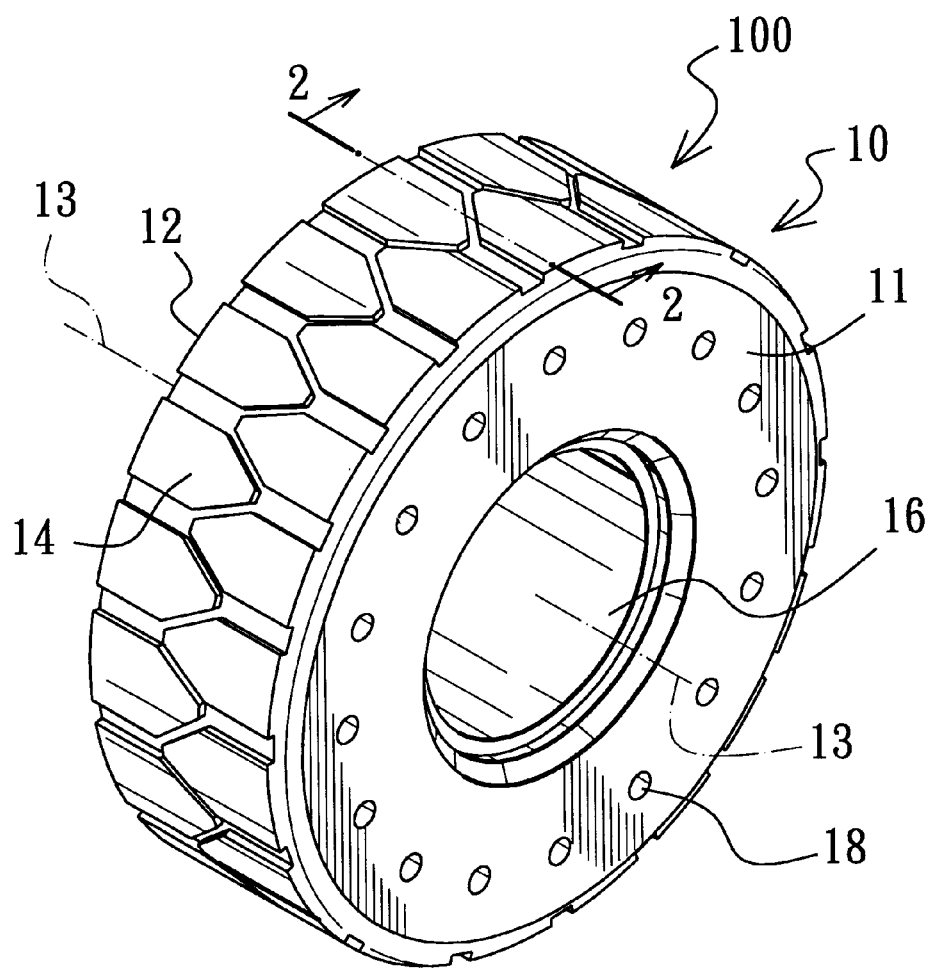
FIG. 1 is a perspective view of a conventional solid tire with a plurality of blind bores.
Figure 2:
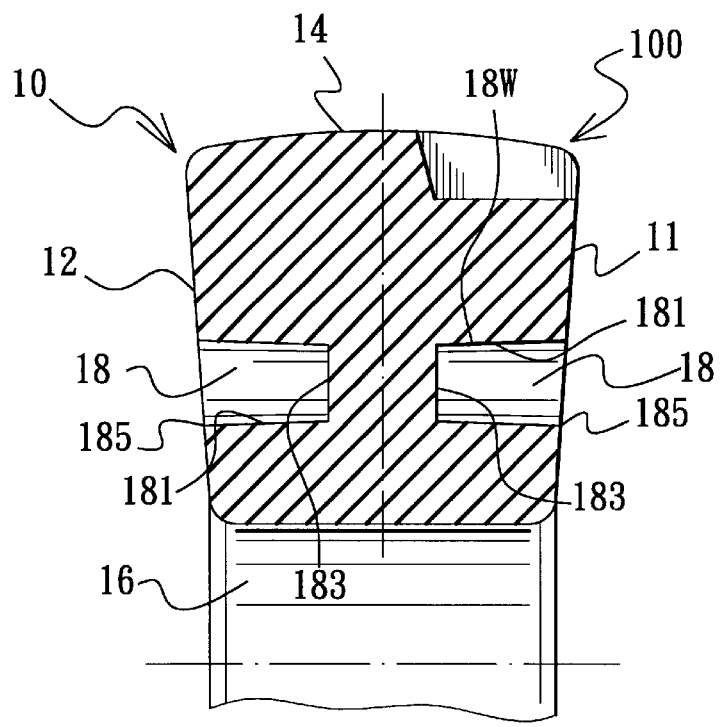
FIG. 2 is a fragmentary sectional view of the conventional solid tire taken along lines 2—2 in FIG. 1.
Figure 3:
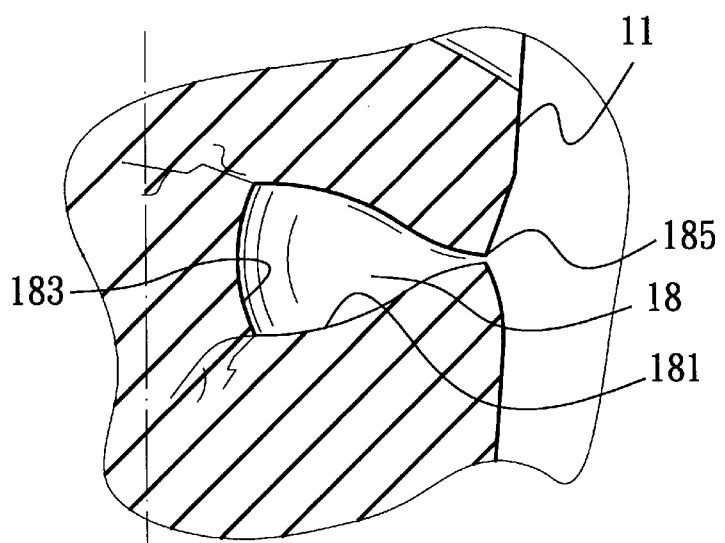
FIG. 3 is a fragmentary sectional view of the conventional solid tire of FIG. 1, illustrating non-uniform deformation of the blind bores during use.
Figure 5:
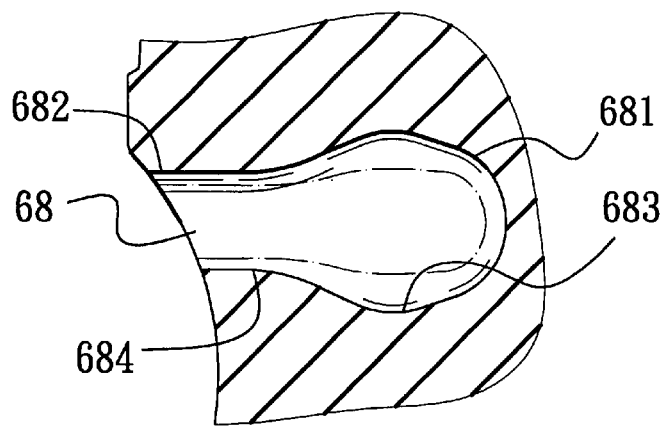
FIG. 5 is an enlarged, fragmentary sectional view of the first preferred embodiment.

Referring to FIGS. 4 and 5, the first preferred embodiment of a solid tire 600 according to the present invention is used in a vehicle for lifting heavy objects, and is shown to include an annular rubber tire body 60.

As illustrated, the tire body 60 defines a rotating axis 66, and has a mounting hole 65, opposite left and right side faces 61, 62, and a circumferential ground contacting face 63 interconnecting the left and right side faces 61, 62. A metal rim (not shown) is fitted into the mounting hole 65 of the tire body 60. The metal rim is adapted to be mounted on a hub of a wheel axle (not shown). Since the feature of the present invention does not reside therein, a detailed description thereof is omitted herein for the sake of brevity.

Each of the left and right side faces 61, 62 of the tire body 60 is formed with a plurality of axially extending blind bores 67, 68. Each of the blind bores 67, 68 has an open end 672, 682, a closed end 671, 681 opposite to the open end 672, 682, a reduced section 674, 684 extending inwardly from the open end 672, 682, and an enlarged section 673, 683 extending from the reduced section 674, 684 to the closed end 671, 681. As best shown in FIG. 5, the enlarged section 683 of each of the blind bores 68 reduces gradually in cross-section toward the reduced section 684 and the closed end 681. As illustrated in FIG. 5, when a heavy load is applied to the tire body 60, a greater extent of deformation occurs at the enlarged section 683 of each of the blind bores 68 such that each of the deformed blind bores 68 is substantially uniform in cross-section.

In this embodiment, the closed end 681, 671 of each of the blind bores 68, 67 in the left and right side faces 62, 61 is rounded. The enlarged section 683, 673 of each of the blind bores 68, 67 is generally rounded in shape. Due to the greater extent of deformation at the enlarged section 683, a better shock-absorbing effect can be obtained during use of the solid tire 600 of the present invention. Each of the blind bores 67, 68 has an axial length which is smaller than half the distance between the left and right side faces 61, 62 of the tire body 60. Preferably, the blind bores 67, 68 in each of the left and right side faces 61, 62 are formed in concentric circles that are centered at the rotating axis 66 of the tire body 60. Each of the blind bores 68 in the left side face 62 can be radially aligned with a corresponding one of the blind bores 67 in the right side face 61, as best shown in FIG. 4. Alternatively, each of the blind bores 68 in the left side face 62 can be axially offset from a respective one of the blind bores 67 in the right side face 61, as shown in FIG. 7. The reduced section 684, 674 of each of the blind bores 68, 67 in the left and right side faces 62, 61 has a uniform cross-section. Moreover, since no sharp corner is formed between the enlarged section 673, 683 and the closed end 671, 681 of each of the blind bores 67, 68 in the left and right side faces 62, 61 of the tire body 60 of the present invention, the problem associated with the breaking of the conventional solid tire at the corners of the bore-defining wall can be eliminated.

Figure 6:
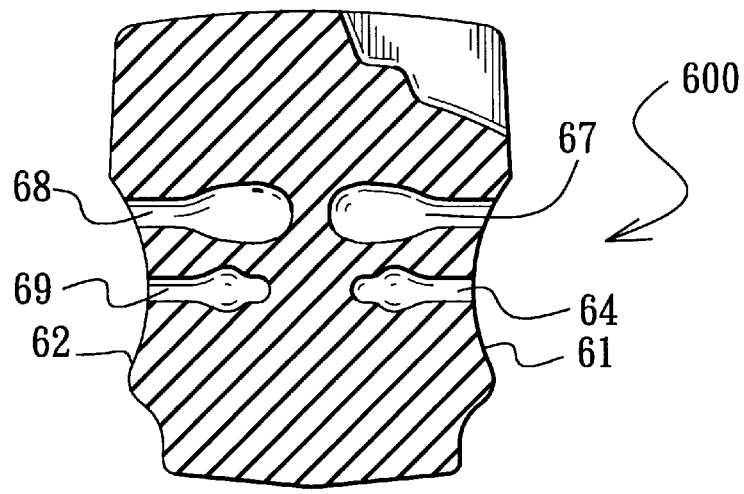
FIG. 6 is a fragmentary sectional view of the second preferred embodiment of a solid tire according to the present invention.

Referring to FIG. 6, the second preferred embodiment of a solid tire 600 of the present invention is shown to have a construction similar to that of the previous embodiment. The main difference resides in that each of the left and right side faces 62, 61 of the tire body 60 is formed with a plurality of annularly arranged inner blind bores 69, 64, and a plurality of annularly arranged outer blind bores 67, 68 which are radially spaced apart from the inner blind bores 69, 64 and that each of the outer blind bores 67, 68 has a cross-section greater than that of each of the inner blind bores 69, 64.

With this invention thus explained, it is apparent that numerous modifications and variations can be made without departing from the scope and spirit of this invention. It is therefore intended that this invention be limited only as indicated in the appended claims.

I claim:

1. A solid tire comprising:
    an annular tire body having opposite left and right side faces and a ground contacting face interconnecting said left and right side faces, each of said left and right side faces being formed with a plurality of axially extending blind bores, each of said blind bores having an open end, a closed end opposite to said open end, a reduced section extending inwardly from said open end, and an enlarged section extending from said reduced section to said closed end, said enlarged section reducing gradually in cross-section toward said reduced section and said closed end.

2. The solid tire as defined in claim 1, wherein each of said blind bores has an axial length which is smaller than half the distance between said left and right side faces.

3. The solid tire as defined in claim 1, wherein said blind bores in each of said left and right side faces are formed in concentric circles that are centered at an axis of the tire body.

4. The solid tire as defined in claim 3, wherein each of said blind bores in one of said left and right side faces is axially aligned with a corresponding one of said blind bores in the other one of said left and right side faces.

5. The solid tire as defined in claim 3, wherein each of said blind bores in one of said left and right side faces is axially offset from a respective one of said blind bores in the other one of said left and right side faces.

6. The solid tire as defined in claim 1, wherein said closed end is rounded.

7. The solid tire as defined in claim 1, wherein said enlarged section is generally rounded in shape.

8. The solid tire as defined in claim 1, wherein said reduced section has a uniform cross-section.

* * * * *

UNITED STATES PATENT AND TRADEMARK OFFICE
CERTIFICATE OF CORRECTION

PATENT NO.     : 6,719,027 B1                                              Page 1 of 1
DATED          : April 13, 2004
INVENTOR(S)    : Chih-Hsing Chen It is certified that error appears in the above-identified patent and that said Letters Patent is hereby corrected as shown below:

Drawings,
Figure 7, include as follows:

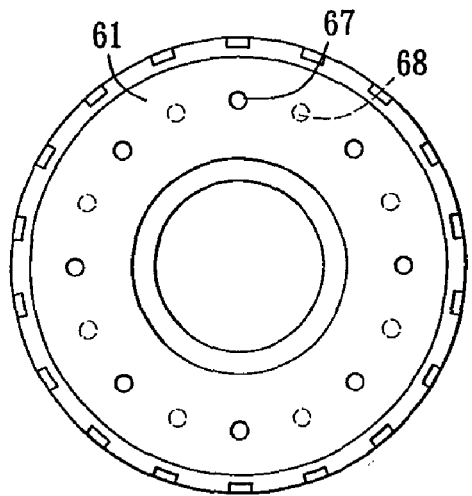

F I G. 7

Signed and Sealed this

Twenty-first Day of June, 2005

JON W. DUDAS
*Director of the United States Patent and Trademark Office*